US011255957B2

(12) United States Patent
Oh

(10) Patent No.: US 11,255,957 B2
(45) Date of Patent: Feb. 22, 2022

(54) TARGET VELOCITY DETECTION

(71) Applicant: Ford Global Technologies, LLC, Dearborn, MI (US)

(72) Inventor: Jinhyoung Oh, Union City, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 284 days.

(21) Appl. No.: 16/752,726

(22) Filed: Jan. 27, 2020

(65) Prior Publication Data

US 2021/0231791 A1     Jul. 29, 2021

(51) Int. Cl.
*G01S 13/58* (2006.01)
*B60W 30/16* (2020.01)
*G01S 7/295* (2006.01)
*G01S 13/931* (2020.01)
*B60K 31/00* (2006.01)

(52) U.S. Cl.
CPC ........... *G01S 13/584* (2013.01); *B60W 30/16* (2013.01); *G01S 7/295* (2013.01); *G01S 13/931* (2013.01); *B60K 2031/0025* (2013.01); *B60W 2420/52* (2013.01)

(58) Field of Classification Search
CPC .......... B60K 2031/0025; B60W 30/16; B60W 2420/52; B60W 2420/60; B60W 30/095; B60W 30/0953; B60W 30/0956; G01S 13/584; G01S 13/931; G01S 7/295; G01S 13/42; G01S 13/589; G01S 13/878; G01S 2013/93271
See application file for complete search history.

(56) References Cited

U.S. PATENT DOCUMENTS

| | | | |
|---|---|---|---|
| 6,982,668 B1 | 1/2006 | Doerry et al. | |
| 8,112,223 B2 * | 2/2012 | Jordan | G01S 13/589 701/300 |
| 9,255,988 B2 | 2/2016 | Zeng et al. | |
| 2018/0356517 A1 | 12/2018 | Cieslar et al. | |

OTHER PUBLICATIONS

Kellner et al., "Instantaneous Full-Motion Estimation of Arbitrary Objects using Dual Doppler Radar", 2014 IEEE Intelligent Vehicles Symposium (IV) Jun. 8-11, 2014.
Kellner et al., "Instantaneous Lateral Velocity Estimation of a Vehicle using Doppler Radar", 16th International Conference on Information Fusion Istanbul, Turkey, Jul. 9-12, 2013.

* cited by examiner

*Primary Examiner* — Timothy A Brainard
(74) *Attorney, Agent, or Firm* — Frank A. MacKenzie; Bejin Bieneman PLC

(57) ABSTRACT

A computer includes a processor and a memory storing instructions executable by the processor to collect at least one set of data with a first Doppler sensor, each set of data including a radial distance, an azimuth angle and a range rate between the first Doppler sensor and a target, collect at least one set of data with a second Doppler sensor, determine that the collected sets of data include a first, second, and third set, determine respective radial components of a ground velocity of the target based on the first, second and third sets of data a position on a host vehicle of the respective Doppler sensor that collected the sets of data, and determine a linear velocity of the target and a yaw rate of the target based on the radial components of the ground velocity of the target.

20 Claims, 4 Drawing Sheets

TARGET VELOCITY DETECTION

BACKGROUND

Vehicles, such as passenger cars, typically include sensors to collect data about a surrounding environment. The sensors can be placed on or in various parts of the vehicle, e.g., a vehicle roof, a vehicle hood, a rear vehicle door, etc. The sensors can collect data about a target, such as a target vehicle, a pedestrian, etc. A computer of the vehicle can process the data to control including to adjust operation of the vehicle.

DETAILED DESCRIPTION

Figure 1:
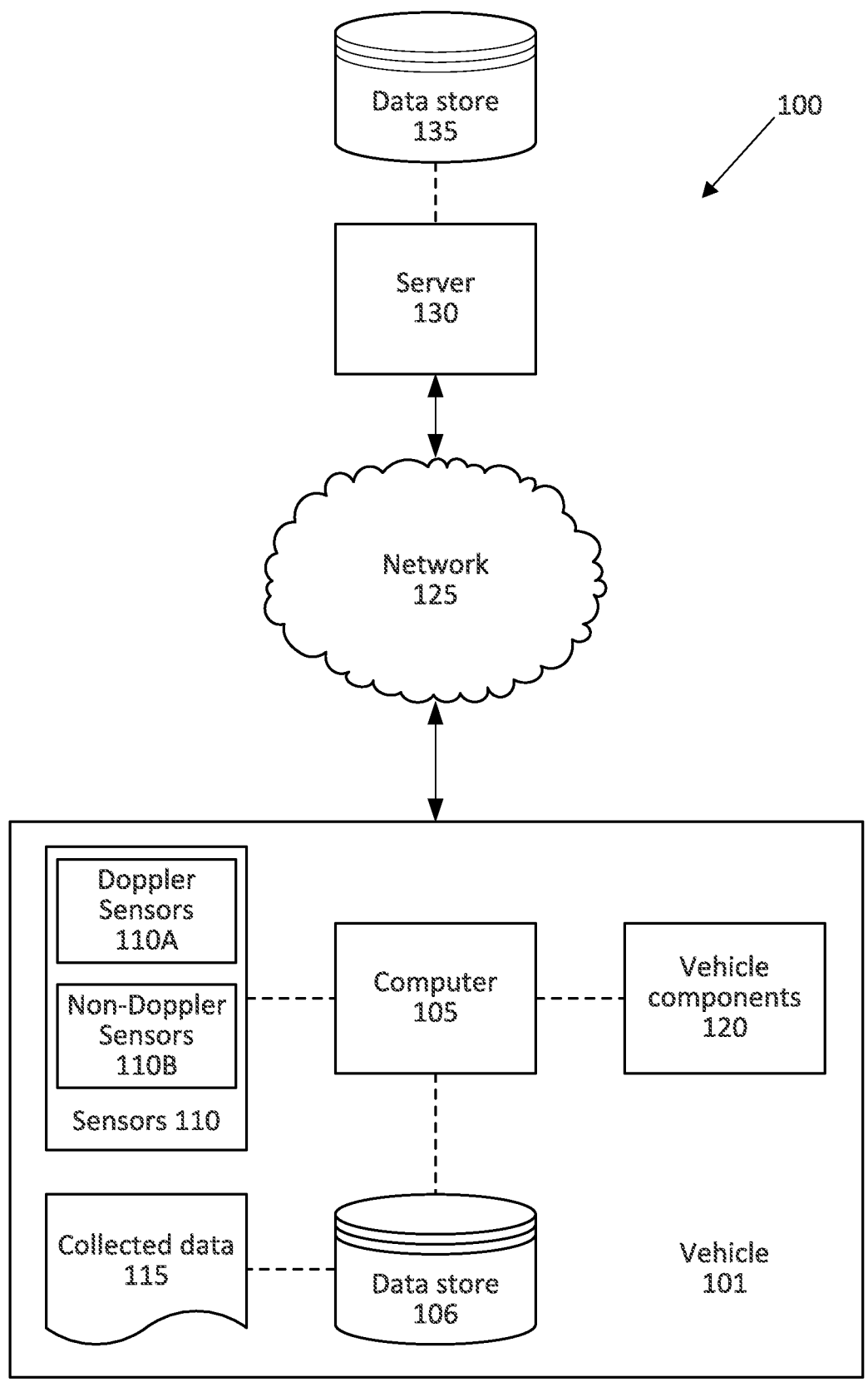
FIG. 1 is a block diagram of an example system for detecting a target velocity.

A system includes a computer including a processor and a memory, the memory storing instructions executable by the processor to collect at least one set of data with a first Doppler sensor, each set of data including a radial distance, an azimuth angle and a range rate between the first Doppler sensor and a target, collect at least one set of data with a second Doppler sensor, each set of data including a radial distance, an azimuth angle, and a range rate between the second Doppler sensor and the target, determine that the collected sets of data include a first set, a second set, and a third set, determine a first radial component of a ground velocity of the target based on the first set of data and a position on a host vehicle of the respective Doppler sensor that collected the first set of data, determine a second radial component of the ground velocity of the target based on the second set of data and a position on the host vehicle of the respective Doppler sensor that collected the second set of data, determine a third radial component of the ground velocity of the target based on the third set of data and a position on the host vehicle of the respective Doppler sensor that collected the third set of data, and determine a linear velocity of the target and a yaw rate of the target based on the first, second, and third radial components of the ground velocity of the target.

The position of the first and the second sensor on the host vehicle can include a lateral position, a longitudinal position, and a mounting angle relative to a longitudinal axis of the host vehicle of the respective first or second sensor.

Each of the first and second Doppler sensors can define a central axis extending from the respective Doppler sensor and the mounting angle can be an angle between the central axis of the Doppler sensor and the longitudinal axis of the host vehicle.

The instructions can further include instructions to determine the linear velocity and the yaw rate upon determining that a number of collected sets of data from the first and second sensors exceeds three.

The instructions can further include instructions to determine the radial component of the ground velocity of the target based on a host vehicle velocity and yaw rate.

The instructions can further include instructions to actuate a third Doppler sensor of a host vehicle to collect at least one set of data including a radial distance, an azimuth angle, and a range rate between the third Doppler sensor and the target.

The instructions can further include instructions to determine the linear velocity of the target based on a relative distance between a first detection point of the target detected by the first Doppler sensor and a second detection point of the target detected by the second Doppler sensor.

The instructions can further include instructions to collect the first set of a radial distance, an azimuth angle, and a range rate between the first Doppler sensor and a first detection point on the target, to collect a second set of a radial distance, an azimuth angle, and a range rate between the first Doppler sensor and a second detection point on the target, to collect the third set of a radial distance, an azimuth angle, and a range rate between the second Doppler sensor and a third detection point on the target, and to determine the linear velocity of the target based on the azimuth angle from the first set, the azimuth angle from the second set, and the azimuth angle of the third set.

Each collected set of data can be associated with a respective detection point on the target, and the instructions can further include instructions to collect sets of data associated with at least three detection points.

The instructions can further include instructions to determine a respective radial component of the ground velocity of the target for each detection point and a respective detection angle between a longitudinal axis of the host vehicle and a line between a center point of the host vehicle and the detection point for each detection point and to determine the linear velocity of the target and the yaw rate of the target based on the radial components of the ground velocity of the target and the detection angles.

The first Doppler sensor can be a radar.

The instructions can further include instructions to determine a lateral component of the linear velocity of the target and a longitudinal component of the linear velocity of the target.

A method includes collecting at least one set of data with a first Doppler sensor, each set of data including a radial distance, an azimuth angle and a range rate between the first Doppler sensor and a target, collecting at least one set of data with a second Doppler sensor, each set of data including a radial distance, an azimuth angle, and a range rate between the second Doppler sensor and the target, determining that the collected sets of data include a first set, a second set, and a third set, determining a first radial component of a ground velocity of the target based on the first set of data and a position on a host vehicle of the respective sensor that collected the first set of data, determining a second radial component of the ground velocity of the target based on the second set of data and a position on the host vehicle of the respective Doppler sensor that collected the second set of data, determining a third radial component of the ground velocity of the target based on the third set of data and a position on the host vehicle of the respective Doppler sensor that collected the third set of data, and determining a linear velocity of the target and a yaw rate of the target based on the first, second, and third radial components of the ground velocity of the target.

The method can further include determining the linear velocity and the yaw rate upon determining that a number of collected sets of data from the first and second sensors exceeds three.

The method can further include determining the radial component of the ground velocity of the target based on a host vehicle velocity and yaw rate.

The method can further include actuating a third Doppler sensor of a host vehicle to collect at least one set of data including a radial distance, an azimuth angle, and a range rate between the third Doppler sensor and the target.

The method can further include determining the linear velocity of the target based on a relative distance between a first detection point of the target detected by the first Doppler sensor and a second detection point of the target detected by the second Doppler sensor.

The method can further include collecting the first set of a radial distance, an azimuth angle, and a range rate between the first Doppler sensor and a first detection point on the target, collecting a second set of a radial distance, an azimuth angle, and a range rate between the first Doppler sensor and a second detection point on the target, collecting the third set of a radial distance, an azimuth angle, and a range rate between the second Doppler sensor and a third detection point on the target, and determining the linear velocity of the target based on the azimuth angle from the first set, the azimuth angle from the second set, and the azimuth angle of the third set.

Each collected set of data can be associated with a respective detection point on the target, and the method can further include collecting sets of data associated with at least three detection points.

The method can further include determining a respective radial component of the ground velocity of the target for each detection point and a respective detection angle between a longitudinal axis of the host vehicle and a line between a center point of the host vehicle and the detection point for each detection point and determining the linear velocity of the target and the yaw rate of the target based on the radial components of the ground velocity of the target and the detection angles.

A system includes a first Doppler sensor of a host vehicle, a second Doppler sensor of the host vehicle, means for collecting at least one set of data with a first Doppler sensor, each set of data including a radial distance, an azimuth angle and a range rate between the first sensor and a target, means for collecting at least one set of data with a second Doppler sensor, each set of data including a radial distance, an azimuth angle, and a range rate between the second Doppler sensor and the target, means for determining that the collected sets of data include a first set, a second set, and a third set, means for determining a first radial component of a ground velocity of the target based on the first set of data and a position on the host vehicle of the respective Doppler sensor that collected the first set of data, means for determining a second radial component of the ground velocity of the target based on the second set of data and a position on the host vehicle of the respective Doppler sensor that collected the second set of data, means for determining a third radial component of the ground velocity of the target based on the third set of data and a position on the host vehicle of the respective Doppler sensor that collected the third set of data, and means for determining a linear velocity of the target and a yaw rate of the target based on the first, second, and third radial components of the ground velocity of the target.

The system can further include means for determining the linear velocity and the yaw rate upon determining that a number of collected sets of data from the first and second sensors exceeds three.

The system can further include means for determining the respective radial component of the ground velocity of the target based on a host vehicle velocity and yaw rate.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Sensors can determine a radial distance, a relative radial speed (i.e., a Doppler speed), and an azimuth angle of a detection point on the target to determine a position of the target. Using the position of the sensor and the collected data from the sensor, a computer of a host vehicle can determine a radial component of the ground velocity of the target at each detection point. Based on the radial components of the ground velocity, the computer can determine the velocity of the target relative to the ground. That is, even though the sensors may only detect a velocity of the target relative to the host vehicle, the computer can determine the velocity of the target relative to the ground based on the position of the sensors on the host vehicle. By using the radial components of the ground velocity, the computer can determine the velocity of the target relative to the ground with only data collected by the sensors and the positions of the sensors.

FIG. 1 illustrates an example system 100 for detecting a target velocity. A computer 105 in a host vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110. The data store 106 can be a separate device from the computer 105, and the computer 105 can retrieve information stored by the data store 106 via a network in the vehicle 101, e.g., over a CAN bus, a wireless network, etc. Alternatively or additionally, the data store 106 can be part of the computer 105, e.g., as a memory of the computer 105.

Sensors 110 can include a variety of devices, including Doppler sensors 110A and non-Doppler sensors 110B. A "Doppler" sensor 110A is a sensor that collects data 115 by emitting a waveform (such as an acoustic or electromagnetic signal) and receiving a return waveform that can be shifted by the Doppler effect. The data 115 can include, e.g., range, azimuth, range rate, etc., as described below. Example Doppler sensors 110A include, e.g., short range radar, long range radar, lidar, and/or ultrasonic transducers. Sensors 110 that are not Doppler sensors 110A are non-Doppler sensors 110B. For example, various controllers in a vehicle 101 may operate as non-Doppler sensors 110B to provide data 115 via the vehicle 101 network or bus, e.g., data 115 relating to vehicle speed, acceleration, position, subsystem and/or component status, etc. Further, other non-Doppler sensors 110B could include cameras, motion detectors, etc., i.e., sensors 110B to provide data 115 for evaluating a position of a component, evaluating a slope of a roadway, etc.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data. The collected data 115 can be stored in the data store 106.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. When the computer 105 operates the vehicle 101, the vehicle 101 is an "autonomous" vehicle 101. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
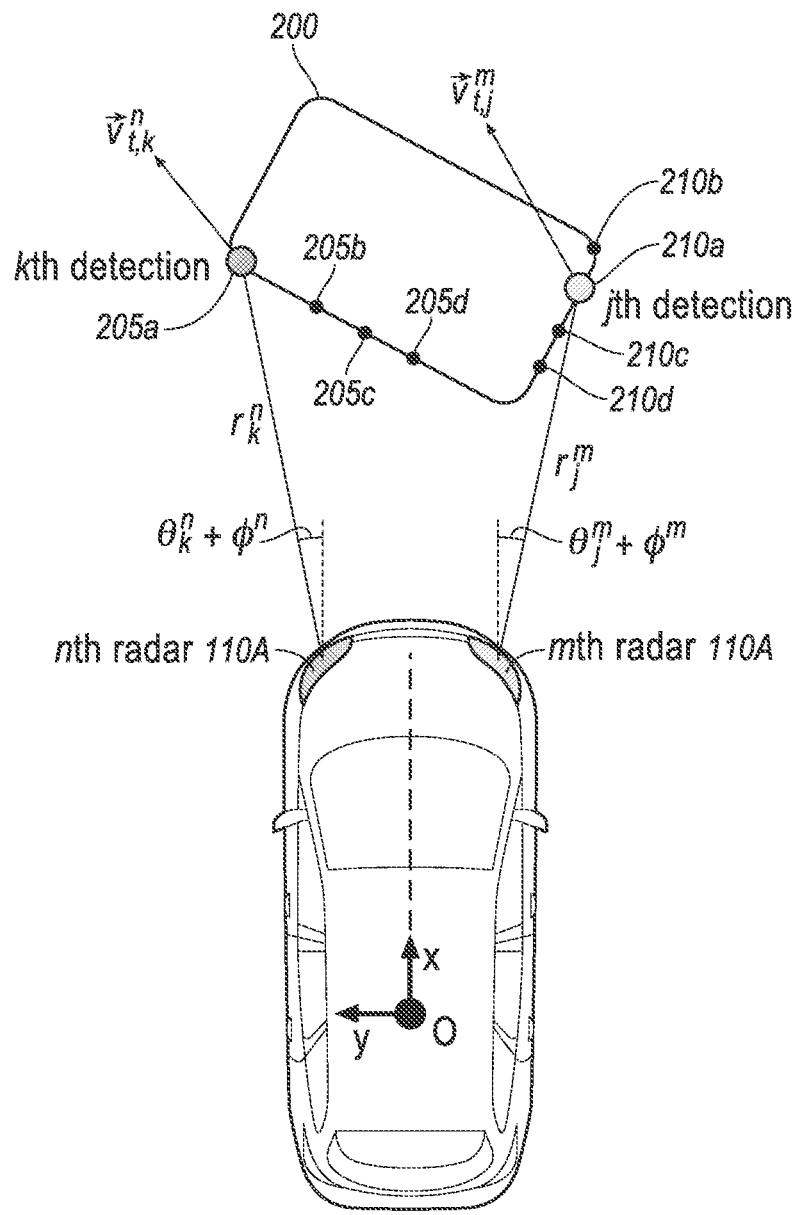
FIG. 2 is a top-down view of a host vehicle and a target.

FIG. 2 is a top-down view of a host vehicle 101 and a target 200. The target 200 is a physical, i.e., material, object, and can be, e.g., a pedestrian, another vehicle, a cyclist, etc. The host vehicle 101 includes a plurality of sensors 110. In the example of FIG. 2, the host vehicle 101 includes a first Doppler sensor 110A (labeled as the nth radar 110A, where n is a natural number) and a second Doppler sensor 110A (labeled as the mth radar 110A, where m is a natural number). The host vehicle 101 can include a different number of Doppler sensors 110A, e.g., a third Doppler sensor 110A, a fourth Doppler sensor 110A, a fifth Doppler sensor 110A, etc. In the example of FIG. 2, the Doppler sensors 110A are radars. Alternatively or additionally, the Doppler sensors 110A can be, e.g., radar, lidar, ultrasonic transducers, etc. Each Doppler sensor 110A can detect the target 200 at a respective detection point 205, 210, i.e., the first Doppler sensor 110A detects first detection points 205a, 205b, 205c, 205d and the second Doppler sensor 110A detects second detection points 210a, 210b, 210c, 210d. The computer 105 can actuate the Doppler sensors 110A, i.e., the computer 105 can instruct the Doppler sensors 110A to collect data 115 to determine the velocity of the target 200. That is, upon activation of the vehicle 101, the computer 105 can instruct the Doppler sensors 110A to begin collecting data 115 and to store the data 115 in the data store 106. The Doppler sensors 110A can collect data 115 about targets 200 without further instruction from the computer 105 and store the data 115 in the data store 106. The computer 105 can retrieve data 115 from the data store 106 to determine the velocity of the target 200, as described below. The computer 105 can be means for collecting data 115 with the Doppler sensors 110A.

A "detection point" in the context of this document is a portion of the target 200 from which the Doppler sensor 110A collects data 115. For example, a radar 110A (e.g., the nth radar 110A of FIG. 2) emits a radar signal toward the target 200, and the radar signal reflects off the target 200 at the first detection point 205. The radar 110A receives the reflected radar signal and, based on a time difference between emission of the radar signal and receipt of the reflected radar signal, the radar 110A can determine, as described below, a range, an azimuth angle, and a range rate between the radar 110A and the detection point 205. Each Doppler sensor 110A can detect a plurality of detection points 205, 210, each detection point 205, 210 corresponding to a specific emission of a signal from one of the Doppler sensors 110A reflected off the target 200. As the host vehicle 101 moves relative to the target 200, the Doppler sensors 110A identify additional detections points 205, 210 as different portions of the target 200. To identify that the detection points 205, 210 are from a single target 200 and not one of a plurality of nearby objects, the computer 105 can filter out detections from stationary objects with a conventional clustering algorithm and host vehicle 101 dynamics data (e.g., speed, yaw rate, etc.). The clustering algorithm groups detections into clusters and identifies targets 200 based on clusters that move relative to the host vehicle 101. That is, the clustering algorithm uses host vehicle 101 data 115 to develop clusters that output detection points 205, 210 that are treated by the computer 105 as from a single, moving target 200.

The host vehicle 101 defines a coordinate system, e.g., a two-dimensional coordinate system with respect to an origin O. The coordinate system defines a longitudinal axis x and a lateral axis y extending from the origin O at a predetermined reference point of the host vehicle 101. The reference point can be, e.g., a center point of a passenger cabin of the host vehicle 101, a center point of a front bumper of the host vehicle 101, a centroid of the host vehicle 101, etc. The longitudinal axis x extends along vehicle-forward direction, i.e., the direction in which a propulsion moves the vehicle 101 when a steering component is at a neutral position. The lateral axis y extends perpendicular to the longitudinal axis x, i.e., a cross-vehicle direction. The host vehicle 101 has a longitudinal velocity $v_x$ along the longitudinal axis x and a lateral velocity $v_y$ along the lateral axis y.

The target 200 has a ground velocity $\vec{v}_t$, i.e., a velocity relative to the ground. The target 200 has a linear velocity $v_{t,x}$, $v_{t,y}$. The "linear velocity" is the ground velocity $\vec{v}_t$ of the target 200 represented in the coordinate system, including a longitudinal velocity $v_{t,x}$ along the longitudinal axis x and a lateral velocity $v_{t,y}$ along the lateral axis y. That is, the linear velocity $v_{t,x}$, $v_{t,y}$ is the set of components of the ground velocity $\vec{v}_t$ in the coordinate system.

Each Doppler sensor 110A defines a mounting location $R_x$, $R_y$ and a mounting angle $\phi$ in the coordinate system. The mounting location $R_x$, $R_y$ is a pair of (x, y) coordinates in the coordinate system of the location of the Doppler sensor 110A relative to the origin O. That is, the mounting location includes a longitudinal position $R_x$ and a lateral position $R_y$ of the Doppler sensor 110A. The mounting angle $\phi$ is an angle defined between the longitudinal axis x and a line extending from the origin O to the Doppler sensor 110A.

Each detection point 205, 210 defines a set of data 115 including a range r, an azimuth angle $\theta$, and a range rate $\dot{r}$. The "range" r is a relative straight-line distance between the Doppler sensor 110A and the detection point 205, 210 in the coordinate system. The "azimuth angle" $\theta$ is an angle defined between a central axis of the Doppler sensor 110A and a line extending from the Doppler sensor 110A to the detection point 205, 210. The azimuth $\theta$ is thus a detection angle between the Doppler sensor 110A and the detection point 205, 210. The "range rate" $\dot{r}$ is a time rate of change of the range r. The range rate $\dot{r}$ is a "Doppler velocity," i.e., a radial component of a relative velocity between the host vehicle 101 and the target 200. The sets of data 115 for each detection point 205, 210 can be stored in the data store 106, and the computer 105 can be means for collecting the sets of data 115 for each detection point 205, 210 from the data store 106.

Figure 3:
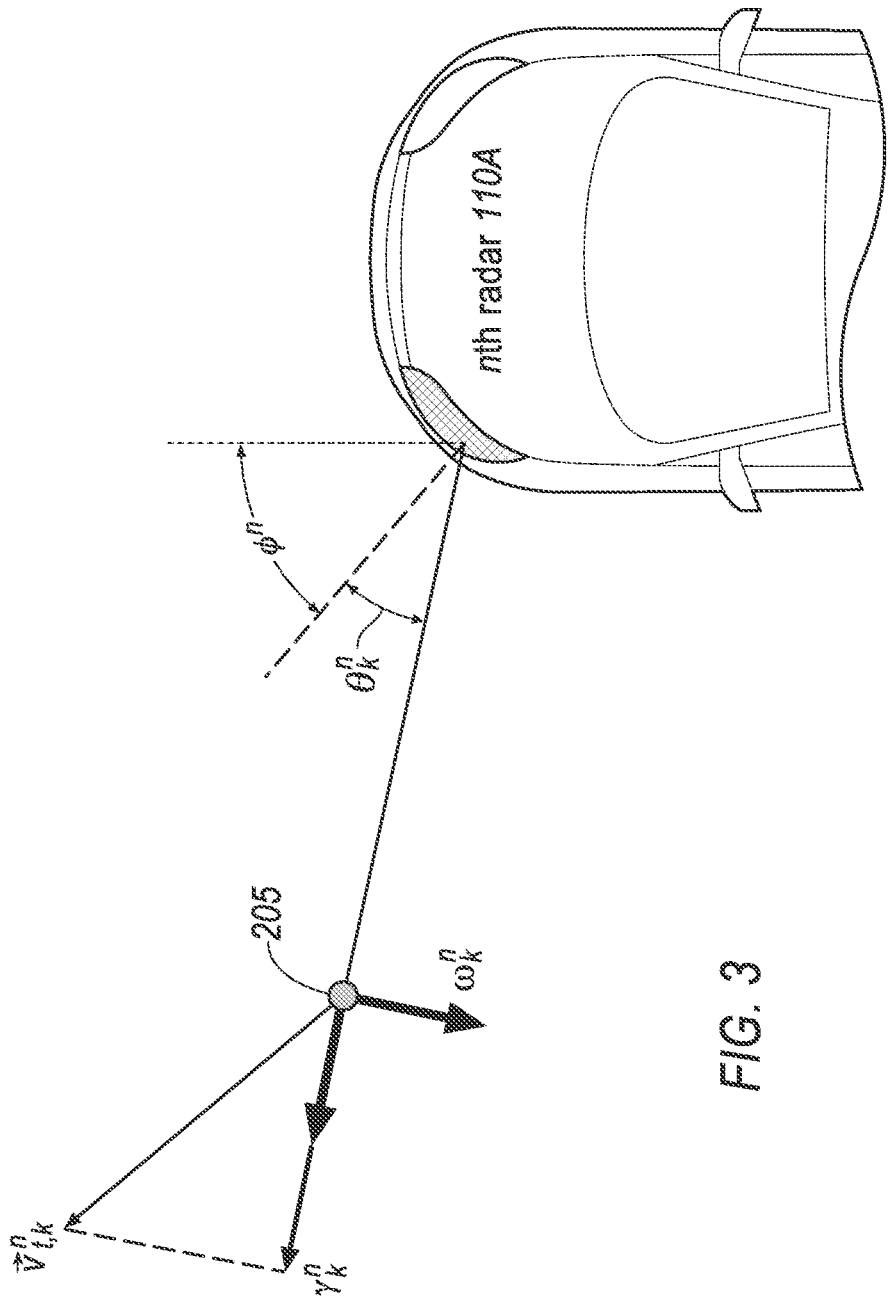
FIG. 3 is a top-down view of a detection point on the target illustrating a radial velocity.

In the example of FIGS. 2-3, the Doppler sensors 110A are radars 110A and represented with indexes m, n, and the detection points 205, 210 are represented with indexes k,j. That is, for a plurality of radars 110A, one of the radars 110A can be an nth radar 110A and another of the radars 110A can be an mth radar 110A, where m, n are integers between 1 and the total number of radars 110A. For a plurality of detection points 205, 210, one of the detection points 205 can be a kth detection point and one of the detection points 210 can be a jth detection point, where k,j are integers between 1 and the total number of detection points 205, 210.

FIG. 3 is a top-down view of a radar 110A detecting a detection point 205 on a target 200. The computer 105 can determine a radial component of the ground velocity $\vec{v}_t$ of the target 200, i.e., a "radial velocity" $\gamma$, for an nth radar 110A at a kth detection point 205:

$$\gamma_k^n = \dot{r}_k^n + (v_y + R_x^n \dot{\psi})\sin(\theta_k^n + \phi^n) + (v_x - R_y^n \dot{\psi})\cos(\theta_k^n + \phi^n) \quad (1)$$

That is, the ground velocity $\vec{v}_t$ can be represented in polar coordinates from the origin O, defining a radial velocity $\gamma$ that is a rate of change of the position of the detection point 205 along a line extending from the origin O to the detection point 205 and a tangential velocity $\omega$ that is a rate of change of an angle defined between the longitudinal axis x and the line connecting the origin O to the detection point 205. The vehicle 101 includes a plurality of radars 110A, and the index n refers to one of the plurality of radars 110A, as described above. The nth radar 110A can detect a plurality of detection points 205, and the index k refers to one of the detection points 205 detected by the nth radar 110A, as described above. For example, a first detection point 205a from a first radar 110A has a radial velocity $\gamma_1^1$. The computer 105, including programming stored in a memory for a processor to execute, can be means for determining a respective radial component of the ground velocity $\vec{v}_t$ of the target 200 based on the respective set of data 115 of the detection point 205, 210 and the position on the host vehicle of the respective radar 110A that collected the set of data 115. Based on Equation 1, the computer 105 can be means for determining the radial velocity $\gamma_k^n$ of the target 200 based on the host vehicle 101 velocity $v_x$, $v_y$ and the host vehicle 101 yaw rate $\dot{\psi}$.

The radial velocity $\gamma_k^n$ can be represented in terms of the linear velocity $v_{t,x}$, $v_{t,y}$ of the detection point 205:

$$\gamma_k^n = v_{t,x,k}^n \cos(\theta_k^n + \phi^n) + v_{t,y,k}^n \sin(\theta_k^n + \phi^n) \quad (2)$$

where $v_{t,x,k}^n$ is the longitudinal ground velocity of the kth detection point 205 detected by the nth radar 110, and $v_{t,y,k}^n$ is the lateral ground velocity of the kth detection point 205 detected by the nth radar 110. The computer 105 can determine the radial velocity $\gamma_k^n$ according to Equation 1 above and can use the value of the radial velocity $\gamma_k^n$ in Equation 2 to determine the linear velocity $v_{t,x}$, $v_{t,y}$ of the target 200 However, for a single detection point 205, Equation 2 has two unknown values: $v_{t,x,k}^n$, $v_{t,y,k}^n$, and thus data 115 from a single detection point 205 cannot be used to solve for both $v_{t,x,k}^n$, $v_{t,y,k}^n$.

The computer 105 can determine the linear velocity $v_{t,x}$, $v_{t,y}$ based on a plurality of radial velocities $\gamma$ from a plurality of radars 110A. That is, the computer 105, including programming thereof, can be means for determining the linear velocity $v_{t,x}$, $v_{t,y}$ based on a plurality of radial velocities $\gamma$ from a plurality of radars 110A, e.g., based on at least three radial velocities $\gamma$ from at least two radars 110A as described below. Each radial velocity $\gamma$ corresponds to respective lateral and longitudinal components of the linear velocity $v_{t,x}$, $v_{t,y}$ for each kth detection of the nth radar 110, introducing two additional unknown values $v_{t,x,k}^n$, $v_{t,y,k}^n$ for each determination of $\gamma_k^n$. For example, three radial velocities $\gamma_1^1$, $\gamma_2^1$, $\gamma_3^2$ represented in Equation 2 would result in six values for the linear velocity $v_{t,x,k}^n$, $v_{t,y,k}^n$. To reduce the number of unknown values, the computer 105 can represent the linear velocity $v_{t,x,k}^n$, $v_{t,y,k}^n$ of each detection point 205 in terms of the linear velocity $v_{t,x}$, $v_{t,y}$ of one of the detection points 205. Because the target 200 is a rigid body, the linear velocity $v_{t,x}$, $v_{t,y}$ for each detection point 205 is related by the yaw rate $\dot{\psi}_t$ of the target 200:

$$v_{t,x,k}{}^n = v_{t,x,1}{}^1 - \dot\psi_t r_{k,1,y} \quad (3)$$

$$v_{t,y,k}{}^n = v_{t,y,1}{}^1 - \dot\psi_t r_{k,1,x} \quad (4)$$

where $v_{t,x,1}{}^1$ is the longitudinal component of the linear velocity at a first detection point 205, $v_{t,y,1}{}^1$ is the lateral component of the linear velocity at the first detection point 205, $r_{k,1,x}$ is the longitudinal component of the range r between the nth radar 110A and the first detection point 205, and $r_{k,1,y}$ is the lateral component of the range r between the nth radar 110A and the first detection point 205. Thus, rather than introducing two new unknown values for each new detection point 205, each radial velocity $\gamma_k{}^n$ can be expressed in terms of the linear velocity $v_{t,x,1}{}^1$, $v_{t,y,1}{}^1$ and yaw rate $\dot\psi_t$ of one of the detection points 205, i.e., solving for only three variables. Because the computer 105 only solves for three variables, the computer 105 requires a minimum of three detection points 205, 210. The computer 105, including programming thereof, can be means for determining that the collected sets of data 115 (i.e., the detection points 205, 210) includes at least a first set, a second set, and a third set (i.e., at least three detection points 205, 210). The computer 105 can thus be means for determining the linear velocity $v_{t,x}$, $v_{t,y}$ and the yaw rate $\dot\psi_t$ upon determining that a number of collected sets of data 115 from the radars 110A exceeds three. The computer 105 can determine the linear velocity $v_{t,x}$, $v_{t,y}$ and the yaw rate $\dot\psi_t$ for a minimum of three detection points 205, 210 from a minimum of two radars 110A:

$$\begin{bmatrix} \cos(\theta_1^1 + \phi^1) & \sin(\theta_1^1 + \phi^1) & F(1,1,1,1) \\ \cos(\theta_2^1 + \phi^1) & \sin(\theta_2^1 + \phi^1) & F(1,1,2,1) \\ \cos(\theta_3^2 + \phi^2) & \sin(\theta_3^2 + \phi^2) & F(2,1,3,1) \end{bmatrix} \begin{bmatrix} v_{t,x,1}^1 \\ v_{t,y,1}^1 \\ \dot\psi_t \end{bmatrix} - \begin{bmatrix} \gamma_1^1 \\ \gamma_2^1 \\ \gamma_3^2 \end{bmatrix} = 0. \quad (5)$$

$$F(n,m,k,j) = \{R_x^n - R_x^m - r_j^m \cos(\theta_j^m + \phi^m)\} \sin(\theta_k^n + \phi^n) - \quad (6)$$
$$\{R_y^n - R_y^m - r_j^m \sin(\theta_j^m + \phi^m)\} \cos(\theta_k^n + \phi^n)$$

where F is a function that correlates the mounting locations R and mounting angles ϕ of the m, n indexed radars 110 and the respective ranges r and azimuth angles θ for the k, j indexed detection points 205, 210. That is, F accounts for the rigid body correlation between the linear velocities $v_{t,x}$, $v_{t,y}$ of any two detection points 205, 210. By collecting detection points 205, 210 from at least two radars 110, the function F introduces the third column of the matrix in Equation 5. That is, for only one radar 110, n=m, the values $R_x{}^n - R_x{}^m$ and $R_y{}^n - R_y{}^m$ become 0, and the third column of the matrix is a linear combination of first two columns, reducing the matrix to two unique columns. That is, the reduced matrix for only one radar 110A can only solve for two variables when only one radar 110A is considered, and not all three of $v_{t,x}$, $v_{t,y}$, and $\dot\psi_t$. Thus, the computer 105 actuates at least two radars 110A to collect at least three detection points 205, 210. That is, the computer 105 can instruct the radars 110A to collect detection points 205, 210, e.g., upon power-up of the vehicle 101, and the radars 110A can collect detection points 205, 210 without further instruction from the computer 105. The computer 105 can retrieve the detection points 205, 210 stored in the data store 106 over, e.g., the network 125.

The computer 105 can determine the three unknowns, the linear velocity $v_{t,x}$, $v_{t,y}$ and the target yaw rate $\dot\psi_t$, by solving the matrix of three equations listed above as Equation 5 using a conventional matrix solving technique, e.g., least squares, row reduction, etc. That is, the computer 105 can determine the linear velocity $v_{t,x}$, $v_{t,y}$ based on three detected radial velocities γ from at least two radars 110A. The computer 105 can determine more than three radial velocities γ from more than two radars 110A and can determine the linear velocity $v_{t,x}$, $v_{t,y}$ by solving the equations corresponding to each radial velocity γ. The example of FIGS. 2-3 and Equations 5-6 show determining the linear velocity $v_{t,x}$, $v_{t,y}$ and the target yaw rate $\dot\psi_t$ with data 115 from two radars 110A, and the computer 105 can use data 115 from more than two radars 110A, e.g., three radars 110A, four radars 110A, etc. Using additional radars 110A can provide additional data 115 with which the computer 105 can determine the linear velocity $v_{t,x}$, $v_{t,y}$ and the target yaw rate $\dot\psi_t$.

Upon determining the linear velocity $v_{t,x}$, $v_{t,y}$ and the target yaw rate $\dot\psi_t$, the computer 105 can actuate one or more components 120 to avoid the target 200. For example, the computer 105 can predict a path of the target 200 based on the linear velocity $v_{t,x}$, $v_{t,y}$ and can actuate a brake to allow the target 200 to pass the host vehicle 101 when a predicted path of the host vehicle 101 would intersect the predicted path of the target 200. In another example, the computer 105 can actuate a steering motor to steer the host vehicle 101 away from the target 200. By using data 115 from the Doppler sensors 110A to determine the linear velocity $v_{t,x}$, $v_{t,y}$ and the target yaw rate $\dot\psi_t$, the computer 105 can predict two-dimensional and three-dimensional movement of the target 200 more rapidly than a temporal filter such as a Kalman filter. The data 115 from the Doppler sensors 110A provide information more closely dependent on the linear velocity $v_{t,x}$, $v_{t,y}$ and the target yaw rate $\dot\psi_t$ of the target 200 than predictions from the temporal filter, providing faster convergence to the speed of the target 200 than the temporal filter.

Figure 4:
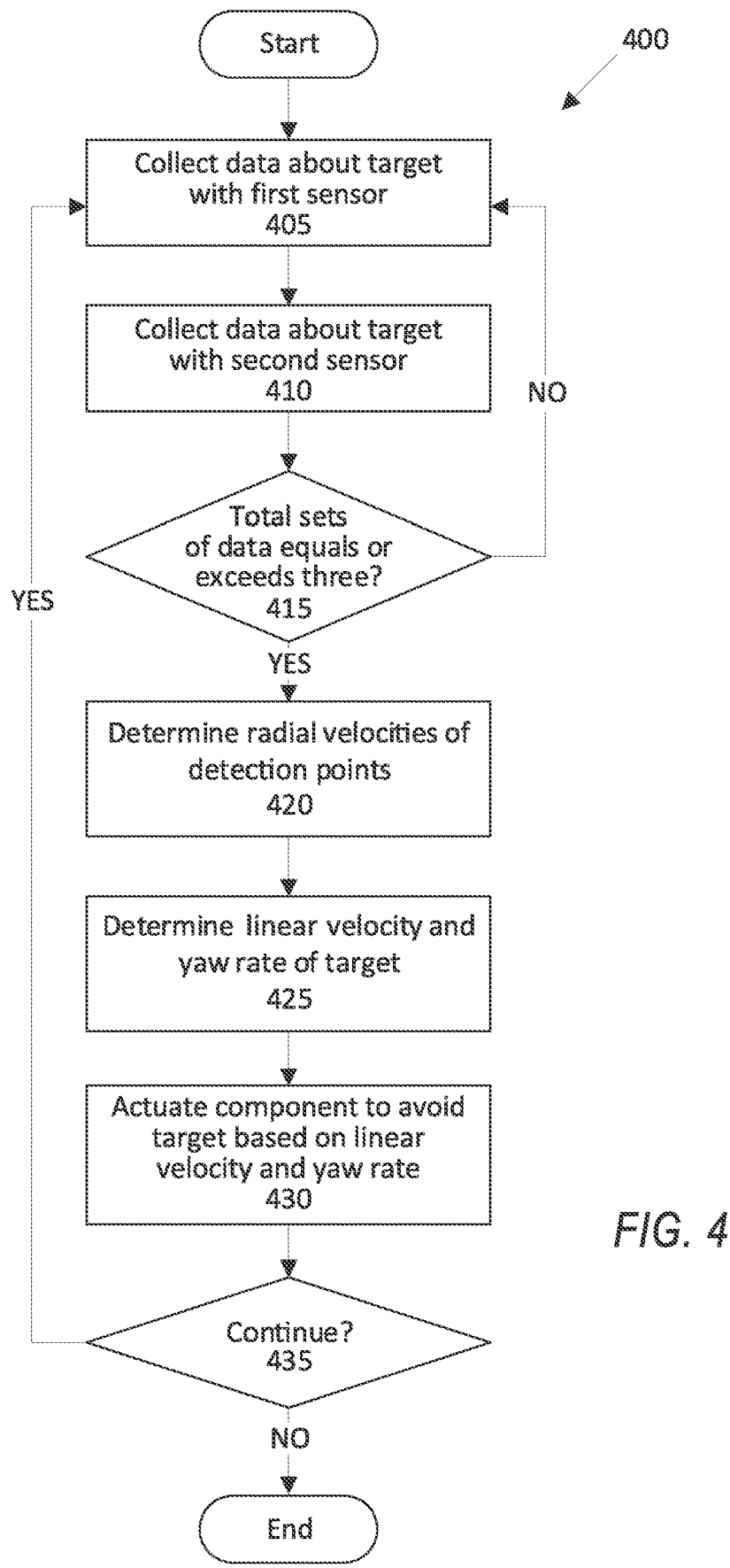
FIG. 4 is a block diagram of an example process for detecting the target velocity.

FIG. 4 is a block diagram of an example process 400 for detecting a linear velocity $v_{t,x}$, $v_{t,y}$ and a yaw rate $\dot\psi_t$ of a target 200. The process 400 begins in a block 405, in which a computer 105 of a host vehicle 101 collects data 115 about a target 200. As described above, a first Doppler sensor 110A can collect a set of data 115 including a range r, an azimuth θ, and a range rate ṙ between the first Doppler sensor 110A and a detection point 205 on the target 200. The first Doppler sensor 110A can provide the collected set of data 115 in the data store 106, and the computer 105 can retrieve the data 115 from the data store 106.

Next, in a block 410, the computer 105 collects data 115 about the target 200. A second Doppler sensor 110A can collect a second set of data 115 including a range r, an azimuth θ, and a range rate ṙ between the second Doppler sensor 110A and a second detection point 210 on the target 200. The second Doppler sensor 110A can store the collected set of data 115 in the data store 106, and the computer 105 can retrieve the data 115 from the data store 106.

Next, in a block 415, the computer 105 determines whether the total number of collected sets of data 115 equals or exceeds three. As described above, the computer 105 requires at least a first set, a second set, and a third set of data 115, the three sets coming from at least two Doppler sensors 110A, to determine the linear velocity $v_{t,x}$, $v_{t,y}$ and the yaw rate $\dot\psi_t$ of the target 200. If the total number of collected sets of data 115 equals or exceeds three, the process 400 continues in a block 420. Otherwise, the process 400 returns to the block 405 to collect more data 115.

In the block 420, the computer 105 determines respective radial velocities γ for each collected set of data 115. As described above, the radial velocity γ is the radial component of the ground velocity $\vec{v}_t$ of the target 200. The computer 105 determine the radial velocity γ based on the position of the respective Doppler sensor 110A from which the data 115 was collected and the set of data 115.

Next, in a block 425, the computer 105 determines the linear velocity $v_{t,x}$, $v_{t,y}$ and the yaw rate $\dot{\psi}_t$ of the target 200. As described above, the computer 105 can use the radial velocities γ and rigid body mechanics of the target 200 to determine the linear velocity $v_{t,x}$, $v_{t,y}$ and the yaw rate $\dot{\psi}_t$ of the target 200. That is, because the computer 105 determines at least three radial velocities γ, the computer 105 can solve for the three unknown variables: the linear velocity $v_{t,x}$, $v_{t,y}$ and the yaw rate $\dot{\psi}_t$.

Next, in a block 430, the computer 105 actuates one or more components 120 to avoid the target 200 based on the linear velocity $v_{t,x}$, $v_{t,y}$ and the yaw rate $\dot{\psi}_t$. For example, the computer 105 can predict a path of the target 200 based on the linear velocity $v_{t,x}$, $v_{t,y}$ and can actuate a brake to allow the target 200 to pass the host vehicle 101 when a predicted path of the host vehicle 101 would intersect the predicted path of the target 200. In another example, the computer 105 can actuate a steering motor to steer the host vehicle 101 away from the target 200.

Next, in a block 435, the computer 105 determines whether to continue the process 400. The computer 105 can determine to continue the process 400 upon detecting another target 200. If the computer 105 determines to continue, the process 400 returns to the block 405. Otherwise, the process 400 ends.

Computing devices discussed herein, including the computer 105 and server 130, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   collect at least one set of data with a first Doppler sensor, each set of data including a first radial distance, a first azimuth angle, and a first range rate between the first Doppler sensor and a target;
   collect at least one set of data with a second Doppler sensor, each set of data including a second radial distance, a second azimuth angle, and a second range rate between the second Doppler sensor and the target;
   determine that the collected sets of data include a first set of data, a second set of data, and a third set of data;
   determine a first radial component of a ground velocity of the target based on the first set of data and a position on a host vehicle of the respective Doppler sensor that collected the first set of data;
   determine a second radial component of the ground velocity of the target based on the second set of data and a position on the host vehicle of the respective Doppler sensor that collected the second set of data;
   determine a third radial component of the ground velocity of the target based on the third set of data and a position on the host vehicle of the respective Doppler sensor that collected the third set of data; and
   determine a linear velocity of the target and a yaw rate of the target based on the first, second, and third radial components of the ground velocity of the target.

2. The system of claim 1, wherein respective positions of the first and the second Doppler sensors on the host vehicle includes a lateral position, a longitudinal position, and a mounting angle relative to a longitudinal axis of the host vehicle.

3. The system of claim 2, wherein each of the first and second Doppler sensors defines a central axis extending from the respective Doppler sensor and the mounting angle is an angle between the central axis of the sensor and the longitudinal axis of the host vehicle.

4. The system of claim 1, wherein the instructions further include instructions to determine the linear velocity and the yaw rate upon determining that a number of collected sets of data from the first and second Doppler sensors exceeds three.

5. The system of claim 1, wherein the instructions further include instructions to determine the radial components of the ground velocity of the target based on a host vehicle velocity and yaw rate.

6. The system of claim 1, wherein the instructions further include instructions to actuate a third Doppler sensor of a host vehicle to collect at least one set of data including a third radial distance, a third azimuth angle, and a third range rate between the third Doppler sensor and the target.

7. The system of claim 1, wherein the instructions further include instructions to determine the linear velocity of the target based on a relative distance between a first detection point of the target detected by the first Doppler sensor and a second detection point of the target detected by the second Doppler sensor.

8. The system of claim 1, wherein the instructions further include instructions to collect the first set of data includes the first radial distance, the first azimuth angle, and the first range rate between the first Doppler sensor and a first detection point on the target, to collect the second set of data includes the second radial distance, the second azimuth angle, and the second range rate between the first Doppler sensor and a second detection point on the target, to collect the third set of data includes the third radial distance, the third azimuth angle, and the third range rate between the second Doppler sensor and a third detection point on the target, and to determine the linear velocity of the target based on the azimuth angle from the first set of data, the azimuth angle from the second set of data, and the azimuth angle of the third set of data.

9. The system of claim 1, wherein each collected set of data is associated with a respective detection point on the target, and the instructions further include instructions to collect sets of data associated with at least three detection points.

10. The system of claim 9, wherein the instructions further include instructions to determine a respective radial component of the ground velocity of the target for each detection point and a respective detection angle between a longitudinal axis of the host vehicle and a line between a center point of the host vehicle and the detection point for each detection point and to determine the linear velocity of the target and the yaw rate of the target based on the radial components of the ground velocity of the target and the detection angles.

11. The system of claim 1, wherein the first Doppler sensor is a radar.

12. The system of claim 1, wherein the instructions further include instructions to determine a lateral component of the linear velocity of the target and a longitudinal component of the linear velocity of the target.

13. A method, comprising:
collecting at least one set of data with a first Doppler sensor, each set of data including a first radial distance, a first azimuth angle, and a first range rate between the first Doppler sensor and a target;
collecting at least one set of data with a second Doppler sensor, each set of data including a second radial distance, a second azimuth angle, and a second range rate between the second Doppler sensor and the target;
determining that the collected sets of data include a first set of data, a second set of data, and a third set of data;
determining a first radial component of a ground velocity of the target based on the first set of data and a position on a host vehicle of the respective Doppler sensor that collected the first set of data;
determining a second radial component of the ground velocity of the target based on the second set of data and a position on the host vehicle of the respective Doppler sensor that collected the second set of data;
determining a third radial component of the ground velocity of the target based on the third set of data and a position on the host vehicle of the respective Doppler sensor that collected the third set of data; and
determining a linear velocity of the target and a yaw rate of the target based on the first, second, and third radial components of the ground velocity of the target.

14. The method of claim 13, wherein respective positions of the first and second Doppler sensors on the host vehicle includes a lateral position, a longitudinal position, and a mounting angle relative to a longitudinal axis of the host vehicle.

15. The method of claim 13, further comprising determining the linear velocity and the yaw rate upon determining that a number of collected sets of data from the first and second Doppler sensors exceeds three.

16. The method of claim 13, further comprising determining the respective radial components of the ground velocity of the target based on a host vehicle velocity and yaw rate.

17. A system, comprising:
a first Doppler sensor of a host vehicle;
a second Doppler sensor of the host vehicle;
means for collecting at least one set of data with the first Doppler sensor, each set of data including a first radial distance, a first azimuth angle, and a first range rate between the first Doppler sensor and a target;
means for collecting at least one set of data with the second Doppler sensor, each set of data including a second radial distance, a second azimuth angle, and a second range rate between the second Doppler sensor and the target;
means for determining that the collected sets of data include a first set of data, a second set of data, and a third set of data;
means for determining a first radial component of a ground velocity of the target based on the first set of data and a position on the host vehicle of the respective Doppler sensor that collected the first set of data;
means for determining a second radial component of the ground velocity of the target based on the second set of data and a position on the host vehicle of the respective Doppler sensor that collected the second set of data;
means for determining a third radial component of the ground velocity of the target based on the third set of data and a position on the host vehicle of the respective Doppler sensor that collected the third set of data; and
means for determining a linear velocity of the target and a yaw rate of the target based on the first, second, and third radial components of the ground velocity of the target.

18. The system of claim 17, wherein respective positions of the first and second Doppler sensors on the host vehicle includes a lateral position, a longitudinal position, and a mounting angle relative to a longitudinal axis of the host vehicle.

19. The system of claim 17, further comprising means for determining the linear velocity and the yaw rate upon determining that a number of collected sets of data from the first and second Doppler sensors exceeds three.

20. The system of claim 17, further comprising means for determining the respective radial components of the ground velocity of the target based on a host vehicle velocity and yaw rate.

\* \* \* \* \*